(12) United States Patent
Chen et al.

(10) Patent No.: US 10,974,163 B2
(45) Date of Patent: *Apr. 13, 2021

(54) STRUCTURED PACKING FOR CATALYTIC DISTILLATION

(71) Applicant: LUMMUS TECHNOLOGY LLC, Bloomfield, NJ (US)

(72) Inventors: Liang Chen, Houston, TX (US); Peter Loezos, Houston, TX (US); Perry Lew, Bloomfield, NJ (US); Bryan Tomsula, Houston, TX (US); Willibrord A. Groten, Pasadena, TX (US); Gary G. Podrebarac, Pasadena, TX (US)

(73) Assignee: LUMMUS TECHNOLOGY LLC, Bloomfield, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/747,352

(22) Filed: Jan. 20, 2020

(65) Prior Publication Data

US 2020/0147513 A1  May 14, 2020

Related U.S. Application Data

(63) Continuation of application No. 16/381,432, filed on Apr. 11, 2019, now Pat. No. 10,537,826.

(Continued)

(51) Int. Cl.
*B01D 3/00* (2006.01)
*B01J 19/32* (2006.01)

(52) U.S. Cl.
CPC ............ *B01D 3/009* (2013.01); *B01J 19/32* (2013.01); *B01J 19/325* (2013.01); *B01J 2219/32213* (2013.01); *B01J 2219/32227* (2013.01); *B01J 2219/32279* (2013.01); *B01J 2219/32286* (2013.01); *B01J 2219/32296* (2013.01)

(58) Field of Classification Search
CPC ... B01J 19/32; B01J 19/325; B01J 8/02; B01J 8/025; B01J 2219/32279; B01J 2219/32286; B01J 2219/32296; B01J 2219/32227; B01J 2219/32213; B01J 2208/00814; B01D 3/009
See application file for complete search history.

(56) References Cited

U.S. PATENT DOCUMENTS

2017/0341997 A1  11/2017 Nyce et al.

FOREIGN PATENT DOCUMENTS

JP  2012166198 A  9/2012

OTHER PUBLICATIONS

Office Action issued in corresponding Taiwan Application No. 108112541, dated Jun. 12, 2020 (5 pages).

*Primary Examiner* — Lessanework Seifu
(74) *Attorney, Agent, or Firm* — Osha Bergman Watanabe & Burton LLP

(57) ABSTRACT

A catalytic distillation structure that may include a rigid framework having at least two grids with a plurality of horizontal fluid permeable tubes mounted to said grids to form a plurality of fluid pathways among the plurality of horizontal fluid permeable tubes. Additionally, each horizontal fluid permeable tubes may have a profile of a six-sided polygon. Further, the catalytic distillation structure may include a plurality of vertically plates or wires connecting vertically aligned tubes of the plurality of horizontal fluid permeable tubes. Furthermore, the plurality of vertically plates or wires connects from a corner of one vertically aligned tubes to a corner of an adjacent vertically aligned tube.

20 Claims, 5 Drawing Sheets

Related U.S. Application Data

(60) Provisional application No. 62/656,219, filed on Apr. 11, 2018.

STRUCTURED PACKING FOR CATALYTIC DISTILLATION

CROSS-REFERENCE TO RELATED APPLICATION

This application claims benefit under 35 U.S.C. § 119 to U.S. patent application Ser. No. 16/381,432, filed on Apr. 11, 2019, which claims benefit to U.S. Provisional Patent Application Ser. No. 62/656,219, filed on Apr. 11, 2018, these applications are incorporated by reference herein in their entirety.

BACKGROUND OF THE INVENTION

Field of the Invention

Embodiments herein relate generally to a distillation structure that may perform the dual function of reaction catalyst and mass transfer surface for distillation. More particularly, embodiments herein relate to a fixed distillation structure which may contain a solid particulate catalyst. The distillation structure packing provided herein may perform the dual function of providing both catalyst for catalytic reaction and mass transfer surface area for distillation.

Related Art

Catalytic distillation is a branch of reactive distillation which combines the processes of distillation and catalysis to selectively separate mixtures within solutions. The main function of catalytic distillation is to maximize the yield of catalytic organic reactions, such as the refining of gasoline. Additionally, catalysts used for catalytic distillation are composed of different substances and packed onto varying objects. For example, the different substances may be highly reactive which can significantly speed up the rate of the reaction making them effective catalysts. Typically, the shapes which the catalysts are packed to form a geometric arrangement to provide spacing in an area (i.e., catalyst bed) in the distillation column where the reactant and catalyst come into contact to form the products. This spacing is meant to ensure the catalysts are spread within the column. Within the catalytic distillation column, liquid reactants are catalyzed while concurrently being heated. As a result, the products immediately begin to vaporize and are separated from the initial solution. By catalyzing and heating the reactants at the same instant, the newly formed products are rapidly boiled out of the system.

The concurrent reaction and separation of products from reactants has been practiced for some time, and the advantages have been recognized. Examples of the use of concurrent reaction and distillation are disclosed in (etherification) U.S. Pat. Nos. 4,232,177; 4,307,254; 4,336,407; 4,504,687; 4,918,243; and 4,978,807; (dimerization) U.S. Pat. No. 4,242,530; (hydration) U.S. Pat. No. 4,982,022; (dissociation) U.S. Pat. No. 4,447,668; and (aromatic alkylation) U.S. Pat. Nos. 4,950,834 and 5,019,669, as well as other more recent patents assigned to Catalytic Distillation Technologies and/or Lummus Technology, the entire teachings of which are incorporated herein by reference.

Several different catalytic distillation structures have been proposed. See for example U.S. Pat. Nos. 4,302,356 and 4,443,559 in which a particulate catalyst is contained within the pockets on a cloth belt wound with demister wire to form a catalytic distillation structure and U.S. Pat. No. 4,731,229 which discloses a packing with corrugated elements and tape to form a catalyst member (the entire teachings of which are incorporated herein by reference). High efficiency packing has been modified to contain catalyst as disclosed in U.S. Pat. Nos. 5,073,236 and 5,730,843, the entire teachings of which are incorporated herein by reference.

U.S. Patent No. 5,730,843 discloses a contact structure comprising a rigid frame comprised of at least two substantially vertical duplicate grids, and a plurality of substantially horizontal diamond shape tubes mounted to the grids to form fluid pathways among the tubes.

SUMMARY OF THE INVENTION

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, the embodiments disclosed herein relate to a catalytic distillation structure that may include a rigid framework having at least two grids with a plurality of horizontal fluid permeable tubes mounted to said grids to form a plurality of fluid pathways among the plurality of horizontal fluid permeable tubes. Additionally, each horizontal fluid permeable tubes may have a profile of a six-sided polygon. Further, the catalytic distillation structure may include a plurality of vertically plates or wires connecting vertically aligned tubes of the plurality of horizontal fluid permeable tubes. Furthermore, the plurality of vertically plates or wires connects from a corner of one vertically aligned tubes to a corner of an adjacent vertically aligned tube.

In one aspect, the embodiments disclosed herein relate to a distillation column reactor, for concurrently carrying out reactions and separating the products from the reactants, that may include a vertically disposed vessel and one or more catalytic distillation structures disposed in the vertically disposed vessel. Additionally, the catalytic distillation structure that may include a rigid framework having at least two grids with a plurality of horizontal fluid permeable tubes mounted to said grids to form a plurality of fluid pathways among the plurality of horizontal fluid permeable tubes. Each horizontal fluid permeable tubes may have a profile of a six-sided polygon. Further, the catalytic distillation structure may include a plurality of vertically plates or wires connecting vertically aligned tubes of the plurality of horizontal fluid permeable tubes. Furthermore, the plurality of vertically plates or wires connects from a corner of one vertically aligned tubes to a corner of an adjacent vertically aligned tube.

It is an advantage of embodiments herein in that greater mobility of fluids within the distillation columns can be obtained. It is a further advantage that the catalytic distillation structures according to some embodiments herein may offer better distillation characteristics than those structures disclosed in the prior art. Other aspects and advantages will be apparent from the following description and the appended claims.

DETAILED DESCRIPTION

Figure 1:
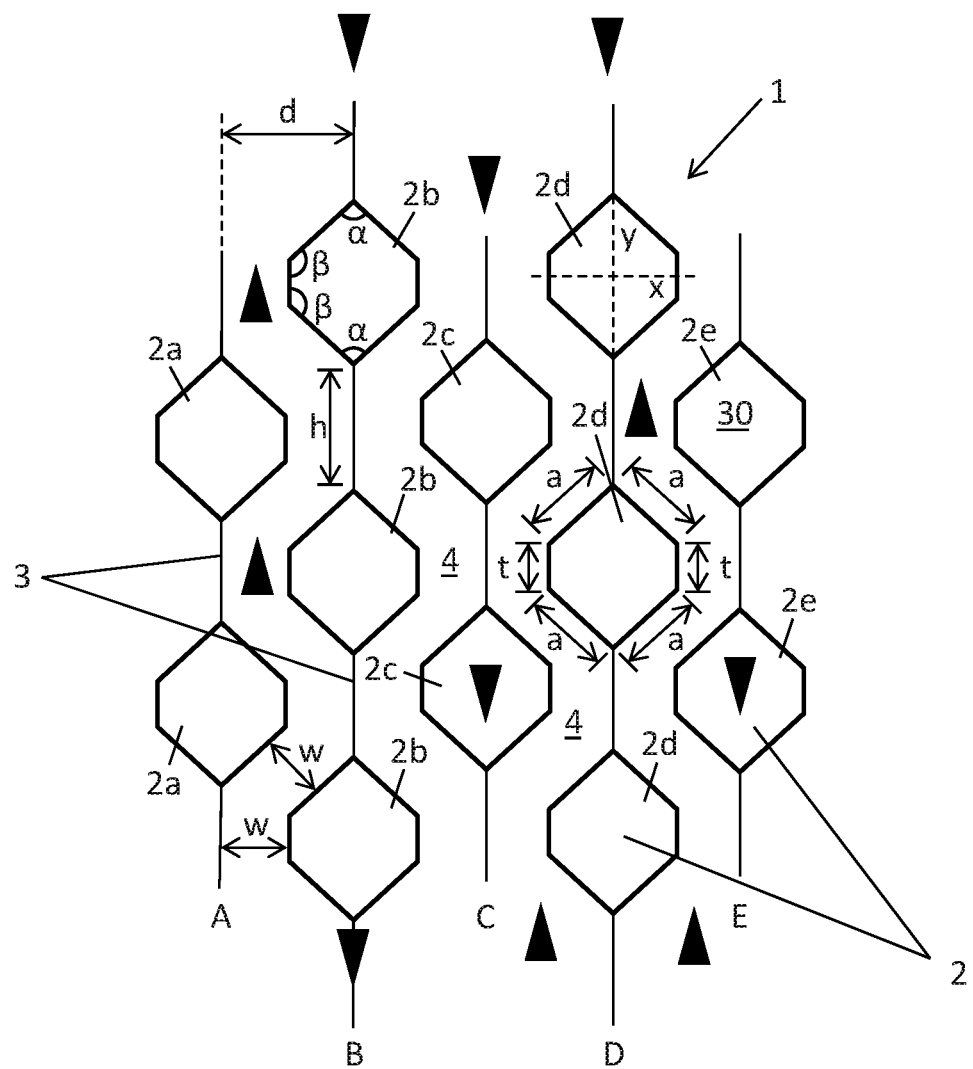
FIG. 1 illustrates a schematic cross section of a packing structure showing catalyst containing elements and spatial relationship in accordance with one or more embodiments of the present disclosure.

Embodiments of the present disclosure are described below in detail with reference to the accompanying figures. Like elements in the various figures may be denoted by like reference numerals for consistency. Further, in the following detailed description, numerous specific details are set forth in order to provide a more thorough understanding of the claimed subject matter. However, it will be apparent to one having ordinary skill in the art that the embodiments described may be practiced without these specific details. In other instances, well-known features have not been described in detail to avoid unnecessarily complicating the description.

In one aspect, embodiments disclosed herein relate to a structure packing for catalytic distillation. As used herein, the term "coupled" or "coupled to" or "connected" or "connected to" may indicate establishing either a direct or indirect connection, and is not limited to either unless expressly referenced as such. Wherever possible, like or identical reference numerals are used in the figures to identify common or the same elements. The figures are not necessarily to scale and certain features and certain views of the figures may be shown exaggerated in scale for purposes of clarification.

Catalytic distillation structures, according to embodiments herein, are apparatuses that include multiple horizontal fluid permeable tubes, arranged in a grid, may include a liquid transfer connection (e.g., wire) between vertically adjacent tubes, and the tubes within the multiple grids that are arranged in a certain layout may be contained within a frame or frame housing (i.e., rigid framework). The arrangement and shape of the horizontal fluid permeable tubes within the frame significantly reduces the complexity and design while improving one or more of the catalyst loading, separation performance, and hydraulic capacity of the catalytic distillation structure. The horizontal fluid permeable tubes are mounted throughout the grids to direct and create flow pathways for fluid in the catalytic distillation structure. As used herein, fluids may refer to liquids, gases, and/or mixtures thereof. In addition, plates may be used to connect the horizontal fluid permeable tubes that are vertically aligned within the frame. Furthermore, the vertically aligned tubes connected via plates may include a first series that may be offset adjacently to a second series of vertically aligned tubes connected via the plates.

Conventional catalytic distillation structures typically have tubes with small catalyst loading to strengthen the hydraulic capacity of the conventional catalytic distillation structure. Conventional catalytic distillation structures may include an extensive layout and arrangement of fluid permeable tubes that provide a small area for catalyst loading with extensive welds and needing a larger number of fluid permeable tubes. In some instances, the fluid permeable tubes create a turbulent flow path for the fluid traveling within the conventional catalytic distillation structure and may include complicated bends or changes in orientation. Such conventional catalytic distillation structures may be both heavier in weight and may also be more expensive to manufacture because of the higher number of parts, components, and welds. Accordingly, one or more embodiments in the present disclosure may be used to overcome such challenges as well as provide additional advantages over conventional catalytic distillation structures, as will be apparent to one of ordinary skill.

In contrast to the diamond structure of U.S. Pat. No. 5,730,843, catalytic distillation structures according to embodiments herein include shapes and structure that may facilitate superior liquid and/or vapor flow characteristics. Catalytic distillation structures disclosed herein include a contact structure comprising vertical plates. Each vertical plate includes multiple horizontal fluid permeable tubes. The vertical connections between each of the fluid permeable tubes may facilitate liquid transfer between vertically adjacent horizontal tubes, thereby providing a flow of liquid to maintain the catalyst or disposed within each horizontal tube as wetted.

The vertical plates may be spaced adjacent to one another, where the tubes are offset vertically to provide a grid having an efficient packing of the plates and a tortuous vapor path (open space between the adjacent plates). The vertical connection between the each vertically adjacent fluid permeable tube may be a solid connection or may be a plurality of wires or fibers interconnecting the tubes. The vertical connection between the tubes of a single plate should be formed of material that facilitates fluid communication between the vertically adjacent tubes, rather than allowing free-fall of liquid from a bottom of a tube, as free-fall of liquid droplets may result in entrainment and decreased performance attributes of the structure.

The configuration of the tubes may be such that liquid flow is guided to the catalyst particles contained within the tubes. In some embodiments, the wetting of the catalyst readily occurs due to the liquid traffic traversing down a plate. In other embodiments, wetting of the catalyst may be enhanced or altered by the external shape of the tubes. In yet other embodiments, it has been found that the liquid traffic and vapor traffic may be routed through a highly packed grid, where the shape of the tubes allows for enhanced hydraulic capacity, enhanced catalysts loading, and overall improved performance of the structure as compared to the diamond-shaped tubes of the prior art noted above.

In one or more embodiments, a structured packing of the present disclosure may include hexagonal-like tubes mounted along each vertical plates, the plates assembled side-by-side to form a new structure packing. The hexagonal-like tubes may accommodate more catalyst in the horizontal fluid permeable tubes to improve catalyst loading without compromising hydraulic capacity as compared with conventional catalytic distillation structure due, in part, to the horizontal fluid permeable tubes having a profile of a six-sided polygon with plates connecting vertically aligned horizontal fluid permeable tubes. The resulting structure may have a smooth transition between adjacent horizontal fluid permeable tubes for a catalytic distillation structure.

Additionally, the catalytic distillation structure may comprise components that are easy to bend into shape (e.g., horizontal fluid permeable tubes made from flat mesh sheets) thus requiring no to minimal welding, relaxing control tolerances and improving manufacture (i.e. reduced cost and reduced time to manufacture). Furthermore, the structured packing for the catalytic distillation structure may need fewer horizontal fluid permeable tubes. Overall the structured packing for the catalytic distillation structure may minimize product engineering, risk associated with permeable tubes manufacture, reduction of assembly time, hardware cost reduction, weight and envelope reduction. Additionally, the structured packing of the catalytic distillation structure may have smoother flow paths, improved catalyst loading, better separation performance, and increased hydraulic capacity, with the flexibility of altering a geometry of the six-sided polygon horizontal fluid permeable tubes connected via plates. Further, according to embodiments of the present disclosure, the catalytic distillation structure may be directly connected to a distillation column reactor such as a vertically disposed vessel or similar structures instead of requiring additional tubes and welds to concurrently carry out reactions and separating the products from the reactants, thus reducing cost and improving performance of such a catalytic distillation system.

Figure 2A:
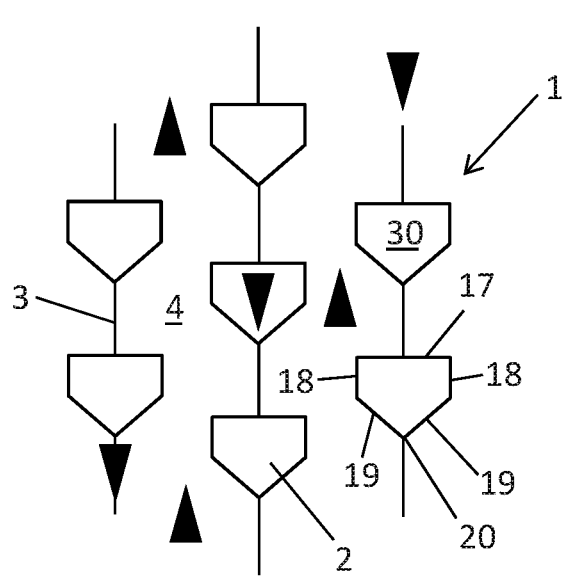
FIGS. 2A-2H illustrate a schematic cross section of a packing structure showing catalyst containing elements and spatial relationship in accordance with one or more embodiments of the present disclosure.
Figure 2B:
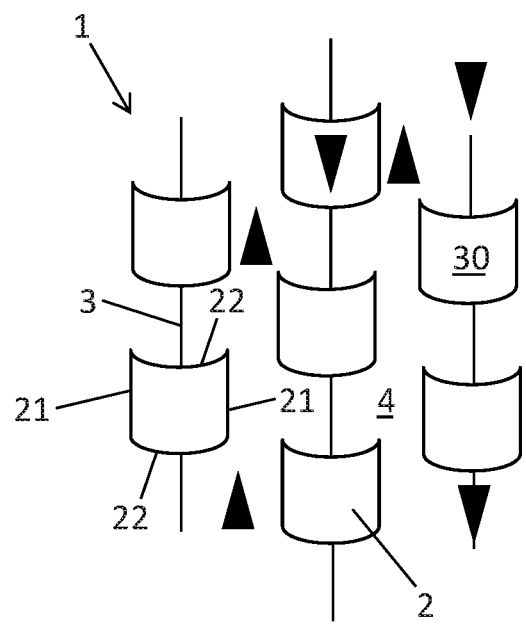
Figure 2C:
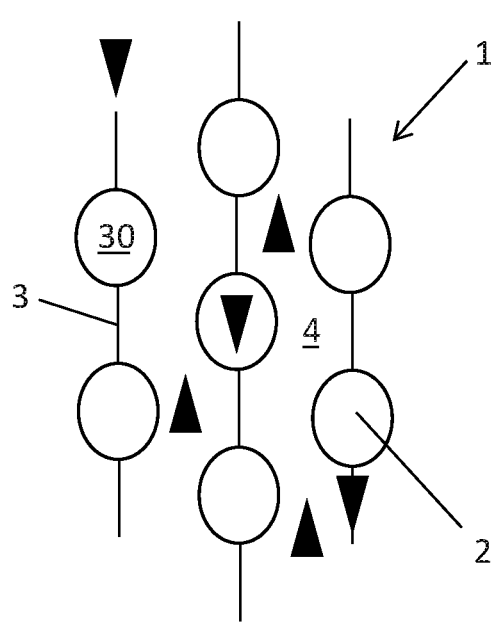
Figure 2D:
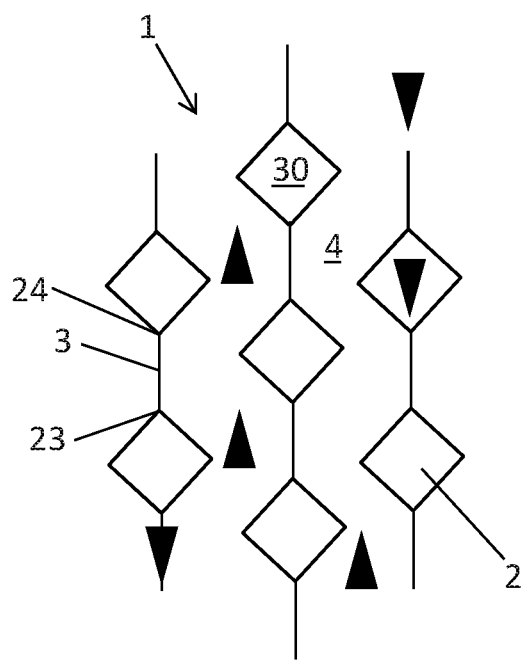
Figure 2E:
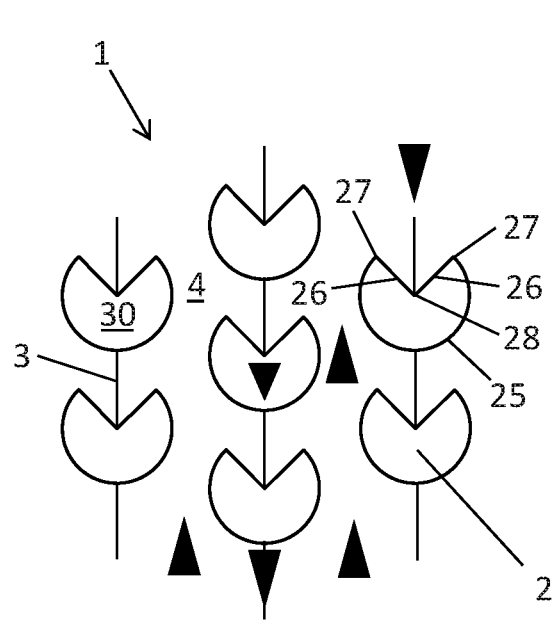
Figure 2F:
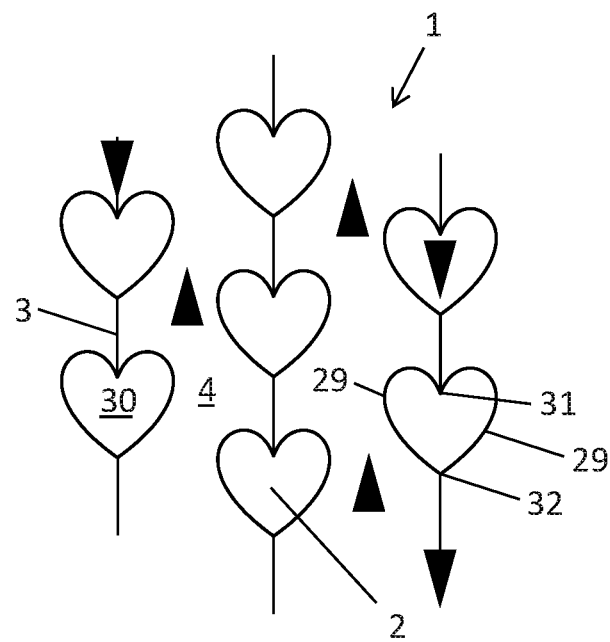
Figure 2G:
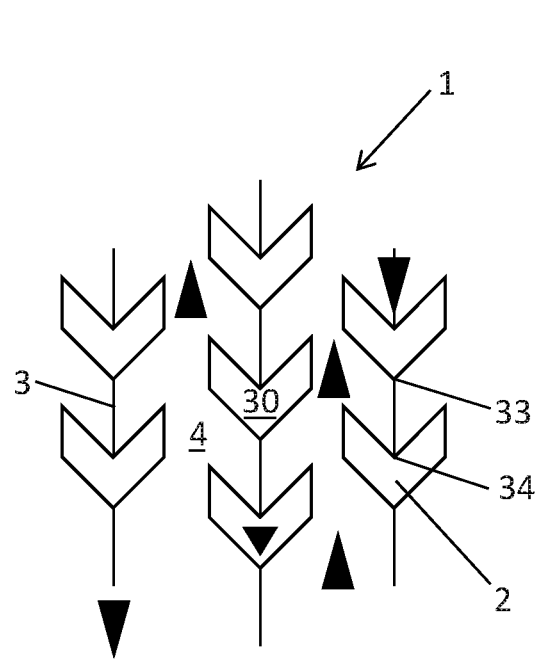
Figure 2H:
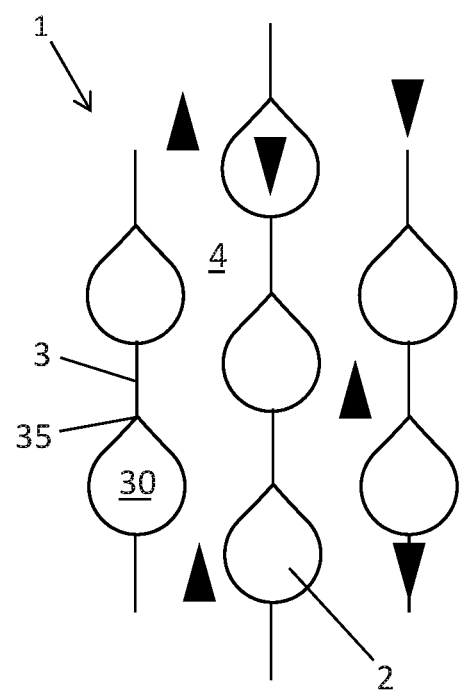
Figure 3:
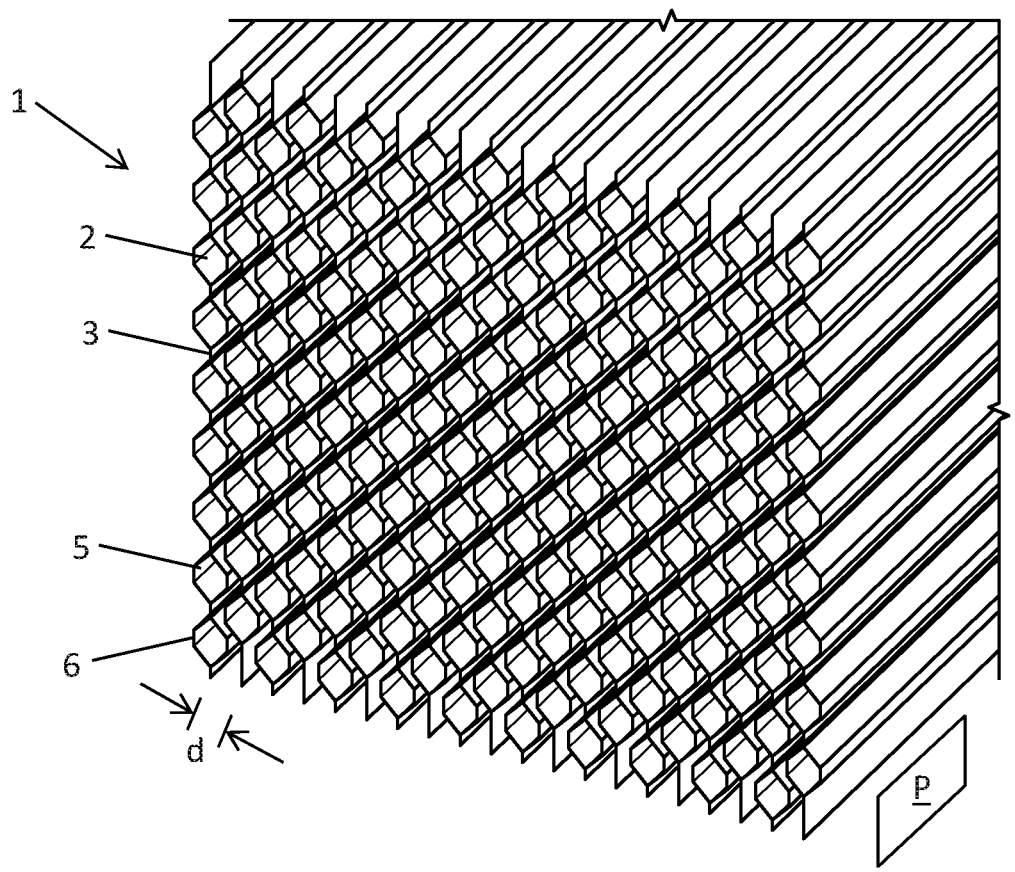
FIG. 3 illustrates an isometric view of the packing structure represented by the spatial relationships of FIG. 1.

With reference to FIGS. 1-3, embodiments herein include a packing structure 1 that has a spatial relationship with respect to how a plurality of horizontal fluid permeable tubes 2 are arranged for a catalytic distillation structure. In some embodiments, the plurality of horizontal fluid permeable tubes 2 may be vertically aligned in the packing structure 1. Additionally, it is also envisioned that the vertically aligned tubes 2 may be connected by a plurality of plates or wires 3, facilitating fluid communication between vertically adjacent plates. In addition, the structure includes a plurality of adjacent rows of said vertically aligned tubes 2. Furthermore, the spatial relationship of the plurality of horizontal fluid permeable tubes 2 creates a tortuous flow path 4. Flow paths, catalyst loading, separation performance, and hydraulic capacity of a catalytic distillation structure can be determined by the spatial relationship of the tubes in the catalytic distillation structure.

Turning to FIG. 1, FIG. 1 illustrates a schematic front view of the packing structure 1 with the plurality of horizontal fluid permeable tubes 2 having a spatial relationship. One skilled in the art will appreciate that while twelve horizontal fluid permeable tubes 2 are shown, this is just for example purposes and there may be any number of horizontal fluid permeable tubes used. The adjacent vertically aligned horizontal fluid permeable tubes are connected by the plurality of plates or wires 3 to be a distance h apart from each other. It is further envisioned that the plurality of horizontal fluid permeable tubes 2 are shaped to have a profile of a six-sided polygon. For example, the six-sided polygon may be a hexagon a having first angle beta ($\beta$) in four corners of the hexagon and a second angle alpha ($\alpha$) in two corners of the hexagon. The second angle alpha ($\alpha$) may be in a bottom-most corner and a top-most corner of the hexagon, such that the plurality of plates or wires 3 are connected at the second angle alpha ($\alpha$) corner of the plurality of horizontal fluid permeable tubes 2. It is further envisioned that the first angle beta ($\beta$) may be larger than the second angle alpha ($\alpha$). For example, the first angle beta ($\beta$) may have the value of 130° degrees and the second angle alpha ($\alpha$) may have the value of 100° degrees, such that the sum of the interior angles ($\beta$, $\alpha$) equal 720° degrees. While specific values are given, the values of the angles ($\beta$, $\alpha$) are only for examples purposes only and the values of the angles ($\beta$, $\alpha$) may be any values without departing from the scope of the present disclosure. Additionally, the hexagon may have sides of which are different lengths. In some embodiments, the hexagon may include four sides at a first length (a) and two sides at a second length (t). Further, the first length (a) may be longer than the second length (t). The second angle alpha ($\alpha$) may be in the corner created by the two of the sides at the first length. The first angle beta ($\beta$) may be in the corner created by one of the sides at the first length and one of the sides of the second length. Additionally, the two sides at the second length (t) may also be parallel to the plurality of plates or wires 3. It is further envisioned that the profile of the plurality of horizontal fluid permeable tubes 2 may be symmetrically along an X-axis and a Y-axis.

Still referring to FIG. 1, the horizontal fluid permeable tubes 2 may be aligned to be in vertically adjacent rows (A-E). For example, the vertically adjacent rows (A-E) may be split into a first series (rows A, C, and E) and a second series (rows B and D). The first series (rows A, C, and E) have the plurality of horizontal fluid permeable tubes 2a, 2c, 2e to be vertically aligned within the corresponding row and the rows A, C, and E may be aligned such that the horizontal fluid permeable tubes 2a, 2c, 2e are horizontally aligned from one row to another within the first series (rows A, C, and E). Additionally, the second series (rows B and D) have the plurality of horizontal fluid permeable tubes 2b, 2d to be vertically aligned within the corresponding row and the rows B and D may be aligned such that the horizontal fluid permeable tubes 2b, 2d are horizontally aligned from one row to another within the first series(rows B and D). While FIG. 1 illustrates five rows with either two or three horizontal fluid permeable tubes within the rows, one skilled in the will appreciate how the packing structure 1 is not limited to five rows with either two or three horizontal fluid permeable tubes and may be any number of rows with any number of horizontal fluid permeable tubes within the rows.

Further shown by FIG. 1, the packing structure 1 is spatially arranged such that the horizontal fluid permeable tubes 2a-2e of adjacent rows (A, C, E with B, D) are offset to allow a portion of the tubes in each column to overlap but not touch. The overlapping provides the tortuous flow path 4 for fluids, thereby providing more opportunity for contact of the fluids with the tubes of the structure. As described above, the adjacent vertically aligned horizontal fluid permeable tubes are connected by the plurality of plates or wires 3 to be the distance h apart from each other within each row (A-E). Additionally, the plurality of plates or wires 3 in one row (A-E) of adjacent vertically aligned horizontal fluid permeable tubes (2a-2e) are spaced a distance d from the plurality of plates or wires 3 of an adjacent row (A-E) of adjacent vertically aligned horizontal fluid permeable tubes (2a-2e). The distance d may be constant for all the plurality of plates or wires 3 between rows (A-E) such that the tortuous flow path 4 is the same between all the rows (A-E) of adjacent vertically aligned horizontal fluid permeable tubes (2a-2e). One skilled in the art will appreciate how the geometry or dimensions of the horizontal fluid permeable tubes 2 and the height h of the plurality of plates or wires 3 manipulate a width of the flow path 4.

In some embodiments, any number of the plurality of horizontal fluid permeable tubes (2a-2e) may contain a catalyst 30 while other tubes (2a-2e) may be empty. In some cases, the plurality of horizontal fluid permeable tubes (2a-2e) may all have catalyst 30 or be empty. Additionally, while some of the plurality of horizontal fluid permeable tubes (2a-2e) contain the catalyst 30 or are empty, any number of the plurality of horizontal fluid permeable tubes (2a-2e) may also include inerts (not shown) or any combination thereof. Inerts are known in the art to be particles which have little or no participation in reducing the activation energy of chemical reactions.

In one or more embodiments, a fraction of open area for vapor and liquid flow at a tightest constriction in the packing structure 1 is given by the dimensions of the horizontal fluid permeable tubes (2a-2e) and the tortuous flow path 4. For example, at the highest catalyst density for a given inter plate distance d, a width w of the tortuous flow path 4 may be substantially constant. It is further envisioned that if lower catalyst densities are desired, the spacing of vertically aligned horizontal fluid permeable tubes (2a-2e) is increased (i.e., the height h of the plurality of plates or wires 3 is increased). Consequently, the width w of the tortuous flow path 4 is varied such that the plurality of horizontal fluid permeable tubes (2a-2e) are further apart from each other while still being at the distance d from the plurality of plates or wires 3. Alternatively, catalyst density may be reduced by the inert packing or empty tubes. Thus, by combinations of structural configuration and tube loading in the packing structure 1 provide a highly adaptable means to contact fluids of great diversity.

One skilled in the art will appreciate how the packing structure 1, as illustrated in FIG. 1, minimizes a hydraulic load on the catalytic distillation structure required to maintain good liquid-catalyst contacting and provides very short contact time between the liquid and catalyst before vapor-liquid exchange occurs. Maintaining good liquid-catalyst contacting and providing very short contact time between the liquid and catalyst before vapor-liquid exchange occurs may provide a more efficient utilization for the catalyst over a range of hydraulic loadings below a flood point and over a wide range of operating conditions such as reflux ratio. Additionally, the packing structure 1 may also have a low height equivalent to a theoretical plate (HETP) in order to provide greater driving force for equilibrium limited systems.

In a catalytic distillation use, there will be both a liquid and a vapor phase. In some embodiments, the liquid will contact the plurality of horizontal fluid permeable tubes 2 and form a film. Additionally, the liquids will be absorbed to an extent into the plurality of horizontal fluid permeable tubes 2 by adsorption onto the catalyst 30 or other filler in the plurality of horizontal fluid permeable tubes 2. Although the packing structure 1 serves as a distillation structure, the presence of the particulate material in the plurality of horizontal fluid permeable tubes 2, and the capillary attraction of the liquid thereto will provide a different environment from conventional methods. In conventional methods, the liquid as well as the gas follow the path of least resistance through the pathways. However, with portions of the liquid in the column being handled by the tubes, there is less competition for the low resistance open pathways, thus producing a lower back pressure than would be expected in conventional methods.

With reference to FIGS. 2A-2H, with respect to FIG. 1, FIGS. 2A-2H illustrate alternative spatial relationships within the packing structure 1 as well as alternative geometries of the tubes. Specifically, FIGS. 2A-2H illustrate the profile of alternative geometries and spatial relationships of the plurality of horizontal fluid permeable tubes 2 to create the tortuous flow path 4 for fluids within the packing structure 1. FIG. 2A shows the plurality of horizontal fluid permeable tubes 2 are shaped to have the profile of a five-sided polygon (i.e., pentagon). For example, the tubes 2 may have a top surface 17 perpendicular to the plates or wires 3, two side surfaces 18 parallel to the plates or wires 3, and two angled surfaces 19 such that two angled surfaces 19 create a point 20. Additionally, the plates or wires 3 may connect vertically aligned tubes 2 from the top surface 17 of one tube to the point 20 of a vertically adjacent tube.

FIG. 2B shows the plurality of horizontal fluid permeable tubes 2 are shaped to have the profile of a cylinder. For example, the tubes 2 may have two side surfaces 21 parallel to the plates or wires 3 and two curved surfaces 22 connected in between the two side surfaces 21. Additionally, the plates or wires 3 may connect vertically aligned tubes 2 from the curved surfaces 22 of one tube to the curved surfaces 22 of a vertically adjacent tube.

FIG. 2C shows the plurality of horizontal fluid permeable tubes 2 are shaped to have the profile of a round polygon. For example, the round polygon may be a circle, oval, or an ellipse. Additionally, the plates or wires 3 may connect vertically aligned tubes 2 from a tangent point of one tube to a tangent point of a vertically adjacent tube.

FIG. 2D shows the plurality of horizontal fluid permeable tubes 2 are shaped to have the profile of a four-sided polygon (i.e., square or diamond). A non-limiting example of the spatial relationship of FIG. 2D is described in U.S. Pat. No. 5,730,843, the entire teachings of which are incorporated herein by reference. Additionally, the plates or wires 3 may connect vertically aligned tubes 2 from a top corner 23 of one tube to a bottom 24 corner of a vertically adjacent tube.

FIG. 2E shows the plurality of horizontal fluid permeable tubes 2 are shaped to have the profile of a pie shape. For example, the tubes 2 may have one rounded surface 25 and two linear surfaces 26. The two linear surfaces 26 each have a first end 27 connected to the one rounded surface 25 and a second end connected together to create a point 28 below the first ends 27. Additionally, the plates or wires 3 may connect vertically aligned tubes 2 from the rounded surface 25 of one tube to the point 28 of a vertically adjacent tube.

FIG. 2F shows the plurality of horizontal fluid permeable tubes 2 are shaped to have the profile of a heart shape. For example, the tubes 2 may have two rounded surfaces 29 to be symmetrical or symmetrical and connect at a top point 31 and a bottom point 32 to create a heart shape. It is further envisioned that the two rounded surfaces 29 may be in fact linear to create a more square-type heart. Additionally, the plates or wires 3 may connect vertically aligned tubes 2 from the top point 31 of one tube to the bottom point 32 of a vertically adjacent tube.

FIG. 2G shows the plurality of horizontal fluid permeable tubes 2 are shaped to have the profile of an arrow or spear. For example, the tubes 2 may be a downward facing arrow (as shown in FIG. 2G) or an upward facing arrow (not shown). Additionally, the plates or wires 3 may connect vertically aligned tubes 2 from a tip of one tube to an internal corner 34 of a vertically adjacent tube.

FIG. 2H shows the plurality of horizontal fluid permeable tubes 2 are shaped to have the profile of a shape of a teardrop likeness. For example, the teardrop is rounded all around with a single tangent point being a corner node 35. Additionally, the plates or wires 3 may connect vertically aligned tubes 2 from the corner node 35 of one tube to a tangent point of a vertically adjacent tube. It is further envisioned that, with reference to FIGS. 1-2H, that the profile of the plurality of horizontal fluid permeable tubes 2 is not limited to just one profile for all the tubes 2 within the respective packing structure 1. One skilled in the art will appreciate how the profiles described in FIGS. 1-2H may be used in conjunction with one another to have a packing structure including a plurality of tubes with different profiles without departing from the scope of the present disclosure.

In some embodiments, with reference to FIGS. 1-2H, one or more tubes 2 may be removed to leave an open space (not shown). The open space may allow for the connection of transverse pathways and provide at least as tortuous pathway for gases, such as an intersticial pathway. The flow of the gases is shown by the upward facing carets (e.g., gases flowing upward). Additionally, liquids may flow over and through the tubes 2 and material therein as shown by the downward facing carets (e.g., liquids flowing downward). The amount of carets is shown for examples purposes only and the liquid and gas flow paths may flow outside the carets without departing from the present disclosure. Further, the liquids may flow over and through the plates or wires 3. As the tubes 2 may contain the catalytic material 30 in particulate form, it is further envisioned that the ends of each tube 2 containing particulate catalytic material may be sealed, for example by crimping, inserted end caps, or welding. Additionally, some of the tubes 2 may be void of any particulate material and/or contain inert particulate material. For example, the void packings may be less dense and provide excellent distillation characteristics with a great deal of open space and surfaces. The inert elements are the packings filled with inert particulate material that may be the same size, smaller or larger than the catalytic particulate material. In some cases, the inert elements allow for all of the same hydraulic characteristics of the catalytic elements but may also reduce the catalytic reactions, which in catalytic distillation also designated reactive distillation that is frequently a reversible reaction. A non-limiting example of reactive distillation is described in U.S. Pat. No. 5,019,669, the entire teachings of which are incorporated herein by reference. Hence, by diluting the reactive elements but maintaining the distillation elements, a higher degree of the separation aspect of the catalytic distillation may be obtainable. In other words, by dispersing the inert elements between the catalytic elements in a given packing structure, the fractional separation is emphasized; while in a system (see FIG. 5) as a whole comprising a column with a plurality of the catalytic packing structures, the force of the reaction is maintained.

Referring to FIG. 3, the plurality of horizontal fluid permeable tubes 2 of the packing structure 1, as shown in FIG. 1, is illustrated in an isometric view without showing a rigid framework (see FIG. 4) in which the packing structure 1 may be installed. While FIG. 3 shows the plurality of horizontal fluid permeable tubes 2 having the profile described in FIG. 1, the profile may be any profile described in FIGS. 1-2H (FIGS. 2A-2H are not shown in an isometric view for simplicity purposes only). Each of the plurality of horizontal fluid permeable tubes 2 may have an opening 5 at a first end 6 of said tubes 2. It is further envisioned that said tubes 2 may have a second opening (not shown) at second end (not shown) opposite of the first end 6. Additionally, said tubes 2 extend horizontally in a horizontal plane P to be a length. Further shown by FIG. 3, the plurality of plates or wires 3 may also extend horizontally in the horizontal plane P to be in unison with the plurality of horizontal fluid permeable tubes 2. Furthermore, the plurality of horizontal fluid permeable tubes 2 are shown to be in adjacent rows (as described in FIG. 1) to be vertically aligned and connected by the plurality of plates or wires 3 within the adjacent rows. In some embodiments, the adjacent rows may be aligned to be side by side at the distance d (as described in FIG. 1). While FIG. 3 illustrates twenty adjacent rows, the present disclosure is not limited to twenty vertically aligned rows and may have one or more vertically aligned rows. It is further envisioned that the horizontal fluid permeable tubes 2 may be made from a group of material selected from a wire mesh material, any permeable material, or a combination thereof. Furthermore, the wire mesh material may be selected from a metal, carbon fiber, plastic, glass, or composite. It is further envisioned that the horizontal fluid permeable tubes 2 may have only a portion made from wire mesh and another portion made from a non-permeable material. Additionally, the plurality of plates or wires 3 may also be made from the wire mesh material, any permeable material, or non-permeable material.

The horizontal permeable tubes 2 of FIGS. 1-3 are illustrated with a particular orientation of the cross-sectional shape of the tube. For example, the teardrop shape of FIG. 2H is illustrated with the angled end of the teardrop facing upward and the rounded portion of the teardrop oriented downward. Embodiments herein also contemplate inversion of the tube shapes disclosed. For example, a tube may have a teardrop shape, with the angled end of the teardrop facing downward and the rounded portion of the teardrop oriented upward.

Further, although the packing structures of FIGS. 1-3 are illustrated with a vertical orientation, it is contemplated herein that the packing structure may be disposed at an angle relative to vertical. In other words, the orientation of the structure may result in an upward, but angled relative to vertical, vapor pathway 4, and the plates or wires 3 may provide a downward, but angled relative to vertical, liquid pathway between tubes 2. Additionally, consecutive vertical sections of the packing structure within a distillation column may be oriented at opposing angles, resulting in a zig-zag pattern for vapor and liquid traffic within the column.

Figure 4:
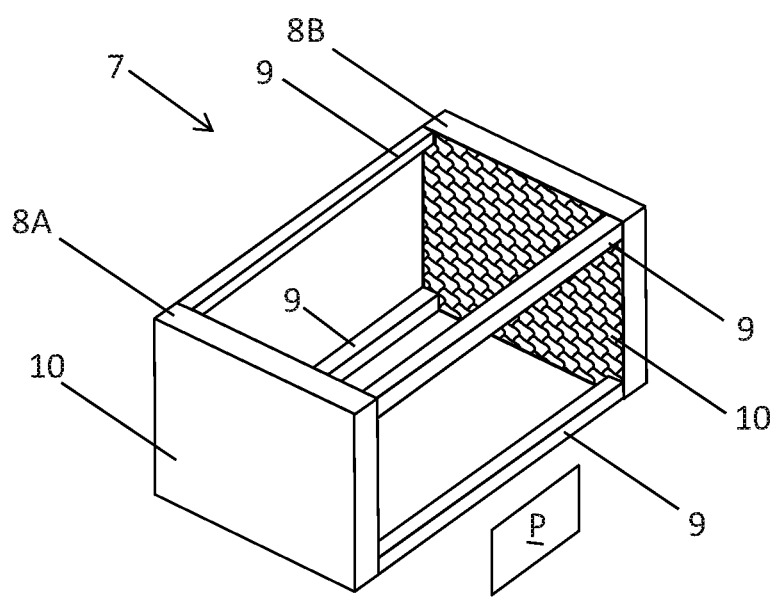
FIG. 4 illustrates an isometric view of a rigid framework for a packing structure in accordance with one or more embodiments of the present disclosure.

FIG. 4, in one or more embodiments, shows a rigid framework 7 in which the packing structure (1 as described in FIGS. 1-3) may be installed or affixed. The rigid framework 7 may include at least two grids 8A, 8B which are spaced apart by one or more support rods 9. Additionally, the support rods 9 are each secured to both grids 8A, 8B, for example by welding, crimping, mechanical fasteners or coupled to be fixed or removable attached. The support rods 9 extend horizontally in the horizontal plane P (same as FIG. 3) to be a length. It is further envisioned that the securing of the grids 8A, 8B together may further include the use of threaded rods and nuts or bolts (not shown). Furthermore, the grids 8A, 8B may have a plurality of openings 10. In some embodiments, the support rods 9 may be affixed in the plurality of openings 10. The resulting structure of FIG. 4 is a rigid and capable frame supporting at least one other structure of the present invention, and loads of 100 to 200 pounds. The rigid framework 7 may be made of a material selected from a metal, carbon fiber, plastic, composite, or any load bearing material.

As described, the packing structure (1) may be installed or affixed to the rigid framework 7. The plurality of horizontal fluid permeable tubes (2) may be mounted to the grids 8A, 8B. For example, the first end (6) of said tubes (2) may be welded, crimped, or coupled to be fixed or removable attached to a first grid 8A, and in addition, the second end of said tubes (2) may be welded, crimped, or coupled to be fixed or removable attached to a second grid 8B. Additionally, the support rods 9 and the tubes (2) may have a similar length to equally space apart the grids 8A, 8B. Further, the plurality of plates (3) may also be welded, crimped, or coupled to be fixed or removable attached to the grids 8A, 8B. It is further envisioned that the tubes (2) may be positioned in the rigid framework 7 such that the openings of the tubes (2) are aligned with the openings 10 of the grids 8A, 8B. In some embodiments, the openings 10 are approximately the same size and configuration as the geometry of the tubes (2), such that the tubes (2) are held fast and bind in the openings 10 when the grids 8A, 8B are secured together by the support rods 9.

Figure 5:
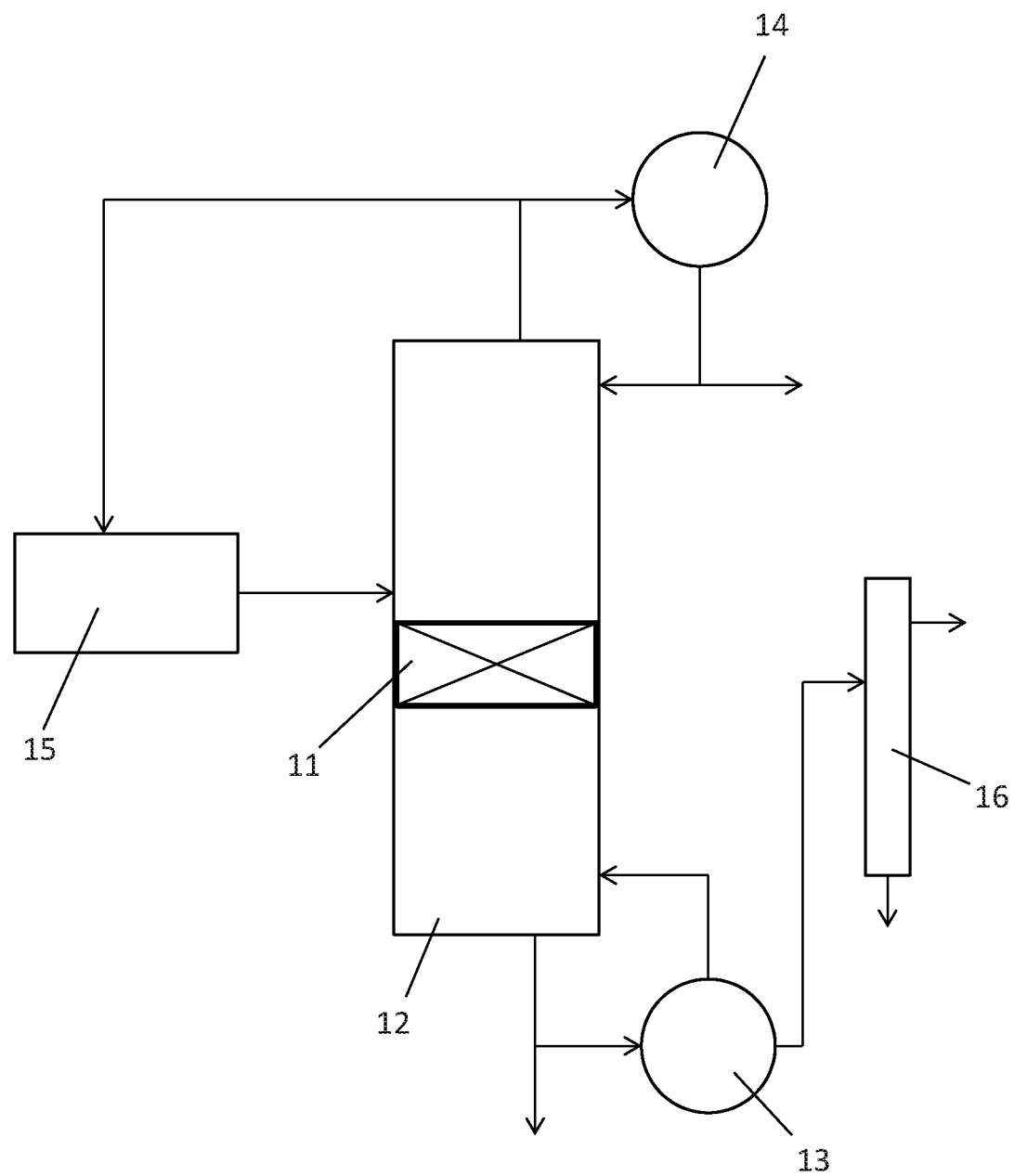
FIG. 5 illustrates a schematic view of a packing structure positioned in a distillation column reactor in accordance with one or more embodiments of the present disclosure.

Referring to FIG. 5, in one or more embodiments, FIG. 5 shows one or more catalytic distillation structure(s) 11 positioned in a distillation column reactor 12. The catalytic distillation structures 11 may include the packing structure (1) with the plurality of horizontal fluid permeable tubes (2) and the rigid framework (7) as described in FIGS. 1-4. Additionally, the catalytic distillation structure(s) 11 may be fixed or removable attached to the distillation column reactor 12 by welding, crimping, adhesives, or mechanical fasteners known in the art. Additionally the catalytic distillation structure(s) 11 may be supported in the distillation column reactor 12 in any efficient manner. For example, the catalytic distillation structure(s) 11 may be supported and separated by inert distillation packing (not shown) such as Rashig rings or the like. Further shown by FIG. 5, the distillation column reactor 12 may have one or more re-boilers 13, condensers 14, and feeding tanks 15 attached therein to the distillation column reactor 12 via flow lines (represented by arrows). In some embodiments, the re-boilers 13 may have one or more separators 16 attached therein via the flow lines.

While FIG. 5 shows only one catalytic distillation structure 11 in the distillation column reactor 12, one skilled in the art will appreciate how the present disclose is not limited to just one catalytic distillation structure 11 and may have additional catalytic distillation structures without departing from the scope of the present disclose. Additionally, the multiple catalytic distillation structures 11 may have same or different packing structures (configurations described in FIGS. 1-2H). It will further be appreciated that more than one catalytic distillation structures 11 may be placed in the distillation column reactor 12 at various heights. In some embodiments, that multiple catalytic distillation structures 11 may be arrayed vertically and laterally in the distillation column reactor 12. Furthermore, the flow line from the feeding tank 15 to the distillation column reactor 12 is shown to be above the catalytic distillation structure 11 in the distillation column reactor 12; however, the present disclosure is not limited to such an arrangement, as the flow lines may be above, below, at, or in between the catalytic distillation structures 11. One skilled in the art will appreciate how the distillation column reactor 12 may be attached to other distillation column reactors. It is further envisioned that a dilution of a volume of catalyst present in the distillation column reactor 12 may be insignificant given the dynamic nature of catalytic distillation and the improved distillation characteristics described above. In some cases, the volume of the catalyst loaded into the wire mesh will depend upon its reaction to swelling.

As described above with respect to FIGS. 1 and 3, FIG. 3 illustrates a 3D schematic of a structure including hexagon-like tubes, and FIG. 1 shows a schematic cross-section of the structure. The hexagonal-like tubes are made of materials permeable to fluid (liquids and/or gases), preferentially wire mesh. All or at least a portion of hexagonal-like tubes can accommodate a catalyst material, promoting catalytic reactions on structure packing. On the other hand, all the surfaces of vertical plates including hexagonal-like tube surfaces along with accommodated catalyst surfaces may facilitate mass transfer and interaction between vapor and liquid phases for a distillation process. As shown in the figures, the vertical plates are assembled to stack together side-by-side to allow the hexagonal-like tubes of adjacent plates offset without touch to form a pathway (4 shown in FIG. 1) for fluids. Each hexagonal-like tube usually is used to accommodate catalyst but not necessarily all tubes need contain catalyst. The dimension of each hexagonal-like tube usually is same and the shape is symmetric along two axes, vertical and horizontal. And, the lengths of sides (e.g., a and t) and the angles such as $\alpha$ and $\beta$ can be adjusted to manipulate the size of a hexagonal-like tube to control the catalyst loading in a structure packing. The number of hexagonal-like tubes per a certain height along each plate, the length (h) of connection line between adjacent tubes along each plate and the distance (d) between adjacent plates can be adjusted as well as the size of a hexagonal-like tube to manipulate the width of the flow pathway (4), which may influence or control hydrodynamic performance or hydraulic capacity of a structure packing. As compared to the structure packing reported in U.S. Pat. No. 5,730,843, embodiments herein possess one or more of the following advantages:

Each hexagonal-like tube may accommodate more catalyst than a diamond tube, which may improve catalyst loading for a specific volume of structure packing without compromising hydraulic capacity or hydrodynamic performance.

A hexagonal-like tube has a smoother transition between adjacent sides than a diamond tube. It means that hexagonal-like tubes are relatively easy to bend from flat mesh sheet, facilitating manufacturing process of this structure packing. It also results in a much smoother transition for fluids to travel along flow pathways during a catalytic distillation process, improving hydraulic capacity of the structure packing.

The hexagonal tubes herein may provide an increased mass loading per unit volume relative to the diamond shaped tubes of U.S. Pat. No. 5,730,843. In some embodiments, the increase in mass loading per unit volume will be in the range from 10% to 50%. Further, the increase in loading (mass per unit volume) can be achieved without significant hydrodynamic impact.

The structure packing may be more cost effective, potentially requiring fewer plates and fewer welds while still achieving the same performance.

The new structure packing design possesses flexibility to achieve desired catalytic distillation performance by varying dimensions of a hexagonal-like tube and arrangement of hexagonal-like tubes along each plate in terms of catalyst loading, separation performance and hydraulic capacity.

In the present hexagonal design, the lengths of sides a and t, and the angles $\beta$ and $\alpha$, can be adjusted to manipulate the size of a hexagonal-like tube.

In summary, embodiments herein are directed toward a new structure packing specifically useful for reactive or catalytic distillation processes. However, the new structure may be generally used for liquid/liquid, gas/liquid or gas/gas concurrent or countercurrent flow in the presence of a catalyst material.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed:

1. A catalytic distillation structure, comprising:
    a rigid framework having at least two grids spaced apart;
    a plurality of fluid permeable tubes mounted to said grids to form a plurality of fluid pathways among the plurality of fluid permeable tubes, wherein each fluid permeable tubes have a profile of a six-sided polygon, wherein each of the fluid permeable tubes extend from a first to a second of the at least two grids;

a plurality of plates or wires connecting and aligning tubes of the plurality of fluid permeable tubes, wherein the plurality of plates or wires connects from a lower-most corner of one aligned tubes to an uppermost corner of an adjacent aligned tube.

2. The catalytic distillation structure of claim 1, further comprising a first series of vertically aligned tubes and a second series of vertically aligned tubes, wherein the first series comprises the plurality of fluid permeable tubes arrayed in a parallel, adjacent and aligned columns within the first series, and the second series comprises the plurality of fluid permeable tubes arrayed in a parallel, adjacent and aligned columns within the second series.

3. The catalytic distillation structure of claim 2, wherein the first series of aligned tubes are offset from the second series of aligned tubes and the fluid permeable tubes of the first series overlap the fluid permeable tubes of the second series without contacting the fluid permeable tubes of the second series of plates to thereby form a tortuous fluid pathway.

4. The catalytic distillation structure of claim 3, wherein a height of the plurality of plates or wires evenly space apart the fluid permeable tubes in the first series and the second series.

5. The catalytic distillation structure of claim 4, wherein the first series and the second series are stacked side-by-side a distance apart.

6. The catalytic distillation structure of claim 3, further comprising a geometry of the six-sided polygon forming a first angle in four corners of the six-sided polygon, a second angle in two corners of the six-sided polygon, wherein the first angle is greater than the second angle.

7. The catalytic distillation structure of claim 6, wherein the second angle is in the corners of vertically aligned tubes that are connected by the plurality of plates or wires.

8. The catalytic distillation structure of claim 7, wherein the six-sided polygon comprises two sides of a first length and four sides of a second length.

9. The catalytic distillation structure of claim 8, wherein the first angle is at a corner of a connection of a side of the first length and a side of the second length and the second angle is at a corner of a connection of two sides of the second length.

10. The catalytic distillation structure of claim 9, wherein the second length is greater than the first length.

11. The catalytic distillation structure of claim 9, wherein the second length is shorter than the first length.

12. The catalytic distillation structure of claim 1, wherein the plurality of fluid permeable tubes and plurality of plates or wires are made of a same material.

13. The catalytic distillation structure of claim 1, further comprising at least one support rod to rigidly hold the at least two grids a distance apart from each other.

14. The catalytic distillation structure of claim 1, wherein each of the plurality of fluid permeable tubes have an opening at a first end and second end of said tubes.

15. The catalytic distillation structure of claim 1, wherein the grids comprises a plurality of openings, wherein the plurality of openings of the grids have a profile equal to the profile of the plurality of fluid permeable tubes.

16. The catalytic distillation structure of claim 1, wherein a series of aligned tubes connected via the plates or wires do not comprise welds.

17. The catalytic distillation structure of claim 16, wherein the plurality of fluid permeable tubes are positioned in the plurality of openings of the grids.

18. The catalytic distillation structure of claim 1, wherein the tubes are horizontal and are aligned vertically.

19. A distillation column reactor for concurrently carrying out reactions and separating the products from the reactants, comprising:

a vertically disposed vessel; and one or more catalytic distillation structures as recited in claim 1 disposed in the vertically disposed vessel.

20. The distillation column reactor of claim 19, wherein the rigid framework is removably attached to the vertically disposed vessel by welding, crimping, adhesives, or mechanical fasteners.

* * * * *